United States Patent
Oikawa (10) Patent No.: US 10,921,041 B2
(45) Date of Patent: Feb. 16, 2021

(54) MOVABLE PLATEN COOLING APPARATUS AND MOVABLE PLATEN COOLING SYSTEM

(71) Applicant: SUMITOMO HEAVY INDUSTRIES, LTD., Tokyo (JP)

(72) Inventor: Ken Oikawa, Nishitokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 336 days.

(21) Appl. No.: 16/131,277

(22) Filed: Sep. 14, 2018

(65) Prior Publication Data
US 2019/0011169 A1    Jan. 10, 2019

Related U.S. Application Data

(63) Continuation of application No. PCT/JP2017/009840, filed on Mar. 10, 2017.

(30) Foreign Application Priority Data

Mar. 16, 2016    (JP) .................................. 2016-052227

(51) Int. Cl.
F25B 9/00     (2006.01)
F25D 13/06    (2006.01)
(Continued)

(52) U.S. Cl.
CPC ............ F25D 13/062 (2013.01); F25B 9/145 (2013.01); F25B 41/003 (2013.01); F25B 41/04 (2013.01);
(Continued)

(58) Field of Classification Search
CPC .... F25D 13/062; F25D 13/067; F25D 29/001; F25B 9/14; F25B 2309/1427; F25B 2600/2515; F25B 41/04
See application file for complete search history.

(56) References Cited

U.S. PATENT DOCUMENTS 3,584,471 A * 6/1971 Powell ................. F25D 13/062
                                                    62/380
7,207,191 B2 * 4/2007 Zhu ......................... F25B 9/10
                                                    62/513
(Continued)

FOREIGN PATENT DOCUMENTS

JP    H10-311618 A    11/1998
JP    H10-313136 A    11/1998
(Continued)

OTHER PUBLICATIONS

JPH10311618A Translation (Year: 1997).*
KR101478288B1 Translation (Year: 2015).*

*Primary Examiner* — Brian M King
(74) *Attorney, Agent, or Firm* — HEA Law PLLC (57) ABSTRACT

A movable platen cooling apparatus includes: a compressor; a cold head that includes a cooling part; a refrigerator gas supply line that supplies a refrigerant gas from the compressor to the cold head; a refrigerator gas exhaust line that exhausts the refrigerant gas from the cold head to the compressor; a first gas inflow line that is connected to a first movable platen flow path and includes a heat exchange part thermally coupled to the cooling part; a first gas outflow line connected to the first movable platen flow path and merged with the refrigerator gas exhaust line; a second gas inflow line connected to a second movable platen flow path and disposed to be thermally non-coupled with the cooling part; and a second gas outflow line connected to the second movable platen flow path and merged with the refrigerator gas exhaust line.

12 Claims, 5 Drawing Sheets

(51) Int. Cl.
*F25B 9/14* (2006.01)
*F25B 41/00* (2021.01)
*F25B 49/02* (2006.01)
*F25B 41/04* (2006.01)
*F25D 19/00* (2006.01)
*F25D 29/00* (2006.01)
*F25D 31/00* (2006.01)
*F25B 25/00* (2006.01)

(52) U.S. Cl.
CPC ............ *F25B 49/02* (2013.01); *F25D 13/067* (2013.01); *F25D 19/006* (2013.01); *F25D 29/001* (2013.01); *F25D 31/001* (2013.01); *F25B 25/005* (2013.01); *F25B 2309/1427* (2013.01); *F25B 2600/0253* (2013.01); *F25B 2600/0271* (2013.01); *F25B 2600/0272* (2013.01); *F25B 2600/2507* (2013.01); *F25B 2600/2515* (2013.01); *F25D 2325/00* (2013.01); *F25D 2400/08* (2013.01); *F25D 2700/12* (2013.01); *F25D 2700/121* (2013.01)

(56) References Cited

U.S. PATENT DOCUMENTS

| | | | |
|---|---|---|---|
| 9,470,436 | B2 | 10/2016 | Takahashi et al. |
| 2006/0097146 | A1 | 5/2006 | Strobel |
| 2012/0085121 | A1 | 4/2012 | Longsworth |

FOREIGN PATENT DOCUMENTS

| | | | | |
|---|---|---|---|---|
| JP | H10311618 | A | * 11/1998 | ................ F25B 9/00 |
| JP | H11-063697 | A | 3/1999 | |
| JP | 2004-301367 | A | 10/2004 | |
| JP | 2006-258313 | A | 9/2006 | |
| JP | 2006-343075 | A | 12/2006 | |
| JP | 2014-169813 | A | 9/2014 | |
| KR | 10-1242677 | B1 | 3/2013 | |
| KR | 10-1478288 | B1 | 1/2015 | |

* cited by examiner

FIG. 7

MOVABLE PLATEN COOLING APPARATUS AND MOVABLE PLATEN COOLING SYSTEM

INCORPORATION BY REFERENCE

The contents of Japanese Patent Application No. 2016-052227, and of International Patent Application No. PCT/JP2017/009840, on the basis of each of which priority benefits are claimed in an accompanying application data sheet, are in their entirety incorporated herein by reference.

BACKGROUND

Technical Field

The present invention in certain embodiments relates to a movable platen cooling apparatus and a movable platen cooling system.

Description of Related Art

A variety of circulative cooling systems that are used to cool objects to extremely low temperatures are known. Such cooling systems typically are configured to cool equipment fixedly installed in a vacuum chamber.

SUMMARY

One embodiment of the present invention affords a movable platen cooling apparatus for cooling a movable platen that holds an object in a vacuum chamber, the cooling apparatus including: a compressor; a cold head that is fixed to the vacuum chamber and includes a cooling part that is disposed in the vacuum chamber; a refrigerator gas supply line that includes a branching part and supplies a refrigerant gas from the compressor to the cold head; a refrigerator gas exhaust line that includes a merging part and exhausts the refrigerant gas from the cold head to the compressor; a first gas inflow line that branches off from the refrigerator gas supply line at the branching part to be connected to a first movable platen flow path such that the refrigerant gas flows from the compressor into the movable platen, the first gas inflow line including a heat exchange part that is thermally coupled to the cooling part; a first gas outflow line that is connected to the first movable platen flow path such that the refrigerant gas flows out from the movable platen to the compressor, and is merged with the refrigerator gas exhaust line at the merging part; a second gas inflow line that branches off from the refrigerator gas supply line at the branching part to be connected to a second movable platen flow path such that the refrigerant gas flows from the compressor into the movable platen, the second gas inflow line being disposed to be thermally non-coupled with the cooling part; and a second gas outflow line that is connected to the second movable platen flow path such that the refrigerant gas flows out from the movable platen to the compressor, and is merged with the refrigerator gas exhaust line at the merging part.

According to another embodiment of the present invention, there is provided a movable platen cooling apparatus for cooling a movable platen that holds an object in a vacuum chamber, the cooling apparatus including: a compressor; a cold head that is fixed to the vacuum chamber and includes a cooling part that is disposed in the vacuum chamber; a refrigerator gas supply line that includes a branching part and supplies a refrigerant gas from the compressor to the cold head; a refrigerator gas exhaust line that includes a merging part and exhausts the refrigerant gas from the cold head to the compressor; a first gas inflow line that branches off from the refrigerator gas supply line at the branching part to be connected to a first movable platen flow path such that the refrigerant gas flows from the compressor into the movable platen, the first gas inflow line including a heat exchange part that is thermally coupled to the cooling part; a first gas outflow line that is connected to the first movable platen flow path such that the refrigerant gas flows out from the movable platen to the compressor, and is merged with the refrigerator gas exhaust line at the merging part; a refrigerator gas flow-rate adjusting valve that is disposed in the refrigerator gas supply line; a first gas flow-rate adjusting valve that is disposed in the first gas inflow line; and a valve control unit that controls at least one of the refrigerator gas flow-rate adjusting valve and the first gas flow-rate adjusting valve, based on status of any from among the movable platen, the compressor, and/or the cold head.

According to still another embodiment of the present invention, there is provided a movable platen cooling system including: a compressor; and a plurality of movable platen cooling sub-systems, each of the plurality of movable platen cooling sub-systems including: a cold head that is fixed to a vacuum chamber and includes a cooling part that is disposed in the vacuum chamber; a refrigerator gas supply line that includes a branching part and supplies a refrigerant gas from the compressor to the cold head; a refrigerator gas exhaust line that includes a merging part and exhausts the refrigerant gas from the cold head to the compressor; a first gas inflow line that branches off from the refrigerator gas supply line at the branching part to be connected to a first movable platen flow path such that the refrigerant gas flows from the compressor into a movable platen that holds an object in the vacuum chamber, the first gas inflow line including a heat exchange part that is thermally coupled to the cooling part; a first gas outflow line that is connected to the first movable platen flow path such that the refrigerant gas flows out from the movable platen to the compressor, and is merged with the refrigerator gas exhaust line at the merging part; a second gas inflow line that branches off from the refrigerator gas supply line at the branching part to be connected to a second movable platen flow path such that the refrigerant gas flows from the compressor into the movable platen, the second gas inflow line being disposed to be thermally non-coupled with the cooling part; and a second gas outflow line that is connected to the second movable platen flow path such that the refrigerant gas flows out from the movable platen to the compressor, and is merged with the refrigerator gas exhaust line at the merging part.

DETAILED DESCRIPTION

It is desirable to provide a cooling apparatus suitable for cooling a movable platen that holds an object in a vacuum chamber.

Optional combinations of constituent elements in the embodiments or mutual substitutions of constituent elements or expressions of the present invention between methods, apparatuses, systems, or the like are also effective as aspects of the present invention.

According to the present invention, it is possible to provide a cooling apparatus suitable for cooling a movable platen that holds an object in a vacuum chamber.

Hereinafter, modes for carrying out the present invention will be described in detail with reference to the drawings. In the description, identical or equivalent elements are denoted by identical or equivalent reference numerals and overlapping description is appropriately omitted. Further, configurations which are described below are exemplification and do not limit the scope of the present invention at all.

Figure 1:
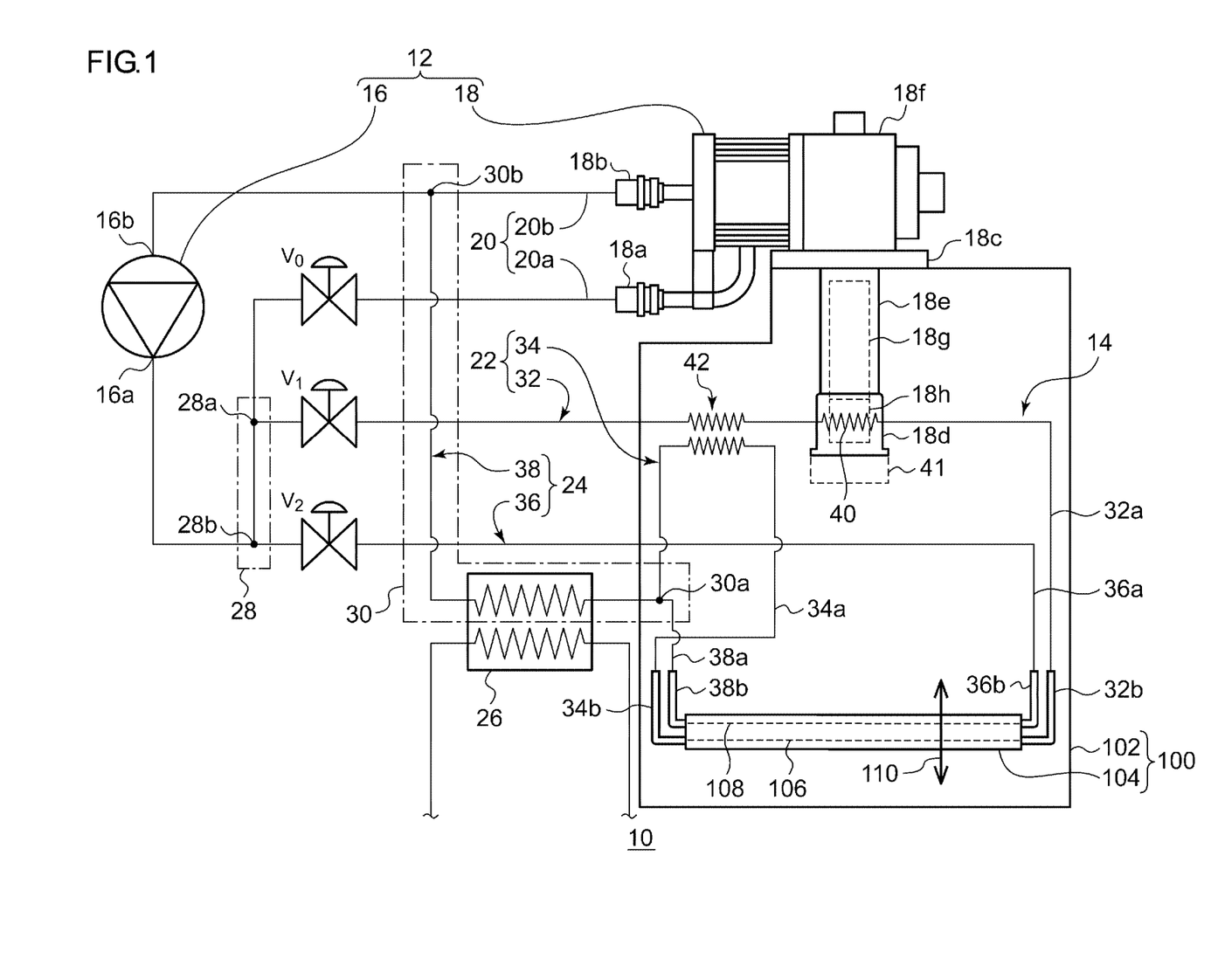
FIG. 1 is a diagram schematically showing an overall configuration of a movable platen cooling apparatus according to one embodiment of the present invention.

FIG. 1 is a diagram schematically showing an overall configuration of a movable platen cooling apparatus (hereinafter appropriately also referred to as a "cooling apparatus") 10 according to an embodiment of the present invention. The cooling apparatus 10 is used together with a vacuum apparatus 100 that is provided with a vacuum chamber 102.

The vacuum apparatus 100 is, for example, a wafer inspection apparatus or a semiconductor inspection apparatus. Alternatively, the vacuum apparatus 100 may be an ion implantation apparatus, a PVD apparatus, or other vacuum process apparatuses. The vacuum apparatus 100 has a movable platen 104 that holds an object (for example, a wafer) in the vacuum chamber 102. The movable platen 104 is configured to be movable in the vacuum chamber 102. The movable platen 104 has a first movable platen flow path 106 and a second movable platen flow path 108 for a refrigerant gas. The first movable platen flow path 106 and the second movable platen flow path 108 are isolated from each other, and the refrigerant gas does not flow between the first movable platen flow path 106 and the second movable platen flow path 108.

In the vacuum apparatus 100 described above, there are instances that require cooling the object to an extremely low temperature (for example, a temperature within a range of about 80 K to about 150 K, or of about 100 K to about 130 K). For this reason, the cooling apparatus 10 is configured to cool the movable platen 104, as described in detail below.

The cooling apparatus 10 includes a cryogenic refrigerator 12 and a circulative cooling device 14. The cryogenic refrigerator 12 includes a compressor 16, a cold head 18, and a refrigerator gas circulation line 20. The circulative cooling device 14 includes a low-temperature gas circulation line 22 and a room-temperature gas circulation line 24. The circulative cooling device 14 may be provided with a chiller 26.

As is known, a refrigerant gas having a first high pressure is supplied from the compressor 16 to the cold head 18. Due to adiabatic expansion in the cold head 18, the refrigerant gas is depressurized from the first high pressure to a second high pressure lower than the first high pressure. The refrigerant gas having the second high pressure is recovered from the cold head 18 to the compressor 16. The compressor 16 compresses the recovered refrigerant gas having the second high pressure. In this way, the pressure of the refrigerant gas is raised to the first high pressure again. In general, both the first high pressure and the second high pressure are considerably higher than atmospheric pressure. For convenience of description, the first high pressure and the second high pressure are also simply referred to as high pressure and low pressure, respectively. Typically, the high pressure is, for example, in a range of 2 to 3 MPa, and the low pressure is, for example, in a range of 0.5 to 1.5 MPa. The pressure differential between the high pressure and the low pressure is, for example, in a range of about 1.2 to 2 MPa. The refrigerant gas is, for example, gaseous helium.

The compressor 16 is installed in a room temperature environment outside the vacuum chamber 102. The compressor 16 is provided with a discharge port 16a for sending the high-pressure refrigerant gas to the refrigerator gas circulation line 20, and a suction port 16b for receiving the low-pressure refrigerant gas from the refrigerator gas circulation line 20.

The circulative cooling device 14 shares the compressor 16 with the cryogenic refrigerator 12. For this reason, the compressor 16 is configured to pressurize the refrigerant gas flowing from the circulative cooling device 14 into the compressor 16 through the suction port 16b and supply the pressurized refrigerant gas to the circulative cooling device 14 again through the discharge port 16a. The cryogenic refrigerator 12 and the circulative cooling device 14 are operated with a common refrigerant gas. Due to the shared use of the compressor 16, the circulative cooling device 14 does not need a dedicated refrigerant gas circulating pump. This enables the cooling apparatus 10 to be made compact.

The cold head 18 is an expander of a cold storage type cryogenic refrigerator such as a Gifford-McMahon type refrigerator (so-called GM refrigerator) or a pulse tube refrigerator, for example. The cold head 18 may be an expander of a single-stage type GM refrigerator. The cold head 18 is provided with a high-pressure port 18a for receiving the high-pressure refrigerant gas from the refrigerator gas circulation line 20, and a low-pressure port 18b for sending the low-pressure refrigerant gas to the refrigerator gas circulation line 20.

Further, the cold head 18 is provided with a flange part 18c, a cooling part 18d, a cylinder part 18e, and a drive mechanism 18f. The cold head 18 is fixed to the vacuum chamber 102 through the flange part 18c. The cooling part 18d is disposed in the vacuum chamber 102. The cylinder part 18e structurally connects the cooling part 18d to the flange part 18c. The drive mechanism 18f is located on the flange part 18c and disposed outside the vacuum chamber 102.

In implementations where the cold head 18 is, for example, a GM refrigerator, the cold head 18 has a displacer 18g which is axially reciprocated by the drive mechanism 18f, and a regenerator (not shown) built into the displacer 18g. The displacer 18g is accommodated in the cylinder part 18e, and the reciprocating movement of the displacer 18g is guided by the cylinder part 18e. The variable volume that is formed between the displacer 18g and the cylinder part 18e by the relative movement of the displacer 18g with respect to the cylinder part 18e is used as an expansion chamber 18h for the refrigerant gas. The expansion chamber 18h is formed in the cooling part 18d. Further, the drive mechanism 18f is configured to alternately switch the supply of the high-pressure refrigerant gas from the compressor 16 to the cold head 18 and the recovery of the low-pressure refrigerant gas from the cold head 18 to the compressor 16.

Appropriately synchronizing the volume change in the expansion chamber 18h and the pressure change in the expansion chamber 18h with each other enables the cold head 18 to produce coldness in the cooling part 18d.

The refrigerator gas circulation line 20 is disposed outside the vacuum chamber 102. The refrigerator gas circulation line 20 includes a refrigerator gas supply line 20a for supplying the refrigerant gas from the compressor 16 to the cold head 18, and a refrigerator gas exhaust line 20b for exhausting the refrigerant gas from the cold head 18 to the compressor 16. The refrigerator gas supply line 20a connects the discharge port 16a to the high-pressure port 18a. The refrigerator gas exhaust line 20b connects the suction port 16b to the low-pressure port 18b. The refrigerator gas supply line 20a may be a rigid pipe, a flexible pipe, or a combination thereof. Similarly, the refrigerator gas exhaust line 20b may be a rigid pipe, a flexible pipe, or a combination thereof.

The refrigerator gas supply line 20a is provided with a branching part 28 between the discharge port 16a and the high-pressure port 18a. The branching part 28 has a first branching point 28a and a second branching point 28b. The branching part 28 may be realized by a known pipe branching instrument such as a joint or a manifold.

Further, the refrigerator gas supply line 20a is provided with a refrigerator gas flow-rate adjusting valve $V_0$ disposed between the branching part 28 and the high-pressure port 18a. The refrigerator gas flow-rate adjusting valve $V_0$ is configured to adjust the refrigerant gas flow rate of the refrigerator gas circulation line 20. The degree of opening of the refrigerator gas flow-rate adjusting valve $V_0$ can be adjusted, whereby it is possible to change the refrigerant gas flow rate.

The refrigerator gas exhaust line 20b is provided with a merging part 30 between the suction port 16b and the low-pressure port 18b. The merging part 30 has a first merging point 30a and a second merging point 30b. The merging part 30 may be realized by a known pipe merging instrument m a joint or a manifold.

The low-temperature gas circulation line 22 includes a first gas inflow line 32 and a first gas outflow line 34. The first gas inflow line 32 branches off from the refrigerator gas supply line 20a at the branching part 28 to be connected to the first movable platen flow path 106 such that the refrigerant gas flows from the compressor 16 into the movable platen 104. The first gas outflow line 34 is connected to the first movable platen flow path 106 such that the refrigerant gas flows out from the movable platen 104 to the compressor 16, and is merged with the refrigerator gas exhaust line 20b at the merging part 30.

The room-temperature gas circulation line 24 includes a second gas inflow line 36 and a second gas outflow line 38. The second gas inflow line 36 branches off from the refrigerator gas supply line 20a at the branching part 28 to be connected to the second movable platen flow path 108 such that the refrigerant gas flows from the compressor 16 into the movable platen 104. The second gas outflow line 38 is connected to the second movable platen flow path 108 such that the refrigerant gas flows out from the movable platen 104 to the compressor 16, and is merged with the refrigerator gas exhaust line 20b at the merging part 30.

The flow path configuration of the circulative cooling device 14 will be described in more detail.

The first gas inflow line 32 includes a first gas inflow conduit 32a and a first gas inflow flexible pipe 32b. The first gas inflow conduit 32a branches off from the refrigerator gas supply line 20a at the first branching point 28a and is connected to one end of the first gas inflow flexible pipe 32b. The other end of the first gas inflow flexible pipe 32b is connected to the inlet of the first movable platen flow path 106 in a way that allows the movable platen 104 to be movable in the vacuum chamber 102. A portion of the first gas inflow conduit 32a is located outside the vacuum chamber 102 and the rest is located inside the vacuum chamber 102. The first gas inflow conduit 32a may be a rigid pipe, a flexible pipe, or a combination thereof.

The first gas inflow line 32 is provided with a first gas flow-rate adjusting valve $V_1$ disposed downstream of the branching part 28. The first gas flow-rate adjusting valve $V_1$ is located on the first gas inflow conduit 32a and is disposed outside the vacuum chamber 102. The first gas flow-rate adjusting valve $V_1$ is configured to adjust the refrigerant gas flow rate of the low-temperature gas circulation line 22. The degree of opening of the first gas flow rate adjusting valve $V_1$ can be adjusted, whereby it is possible to change the refrigerant gas flow rate.

The first gas outflow line 34 includes a first gas outflow conduit 34a and a first gas-outflow flexible pipe 34b. The first gas outflow conduit 34a is connected to one end of the first gas-outflow flexible pipe 34b and merged with the second gas outflow line 38 at the first merging point 30a. The other end of the first gas-outflow flexible pipe 34b is connected to the outlet of the first movable platen flow path 106 in a way that allows the movable platen 104 to be movable in the vacuum chamber 102. The first gas outflow conduit 34a may be a rigid pipe, a flexible pipe, or a combination thereof.

In the illustrated example, the first merging point 30a is located in the vacuum chamber 102 and the first gas outflow conduit 34a is also located in the vacuum chamber 102. However, the first merging point 30a may be located outside the vacuum chamber 102, and in this case, a portion of the first gas outflow conduit 34a may be located outside the vacuum chamber 102 and the rest may be located inside the vacuum chamber 102.

The second gas inflow line 36 includes a second gas inflow conduit 36a and a second gas-inflow flexible pipe 36b. The second gas inflow conduit 36a branches off from the refrigerator gas supply line 20a at the second branching point 28b and is connected to one end of the second gas-inflow flexible pipe 36b. The other end of the second gas-inflow flexible pipe 36b is connected to the inlet of the second movable platen flow path 108 in a way that allows the movable platen 104 to be movable in the vacuum chamber 102. A part of the second gas inflow conduit 36a is located outside the vacuum chamber 102 and the rest is located in the vacuum chamber 102. The second gas inflow conduit 36a may be a rigid pipe, a flexible pipe, or a combination thereof.

The second gas inflow line 36 is provided with a second gas flow-rate adjusting valve $V_2$ disposed downstream of the branching part 28. The second gas flow-rate adjusting valve $V_2$ is located on the second gas inflow conduit 36a and is disposed outside the vacuum chamber 102. The second gas flow-rate adjusting valve $V_2$ is configured to adjust the refrigerant gas flow rate of the room-temperature gas circulation line 24. The degree of opening of the second gas flow rate adjusting valve $V_2$ can be adjusted, whereby it is possible to change the refrigerant gas flow rate.

The second gas outflow line 38 includes a second gas outflow conduit 38a and a second gas-outflow flexible pipe 38b. The second gas outflow conduit 38a has the first merging point 30a in the middle. The second gas outflow conduit 38a is connected to one end of the second gas-outflow flexible pipe 38b and merged with the refrigerator gas exhaust line 20b at the second merging point 30b. The other end of the second gas-outflow flexible pipe 38b is connected to the outlet of the second movable platen flow path 108 in a way that allows the movable platen 104 to be movable in the vacuum chamber 102. A portion of the second gas outflow conduit 38a is located outside the vacuum chamber 102 and the rest is located inside the vacuum chamber 102. The second gas outflow conduit 38a may be a rigid pipe, a flexible pipe, or a combination thereof.

In this manner, flexible pipes, not rigid pipes, are connected to the inlet and outlet of the first movable platen flow path 106 and the inlet and outlet of the second movable platen flow path 108. For this reason, the movable platen 104 can move in the vacuum chamber 102 while being cooled by the circulative cooling device 14. The direction along which the movable platen 104 is movable is exemplarily shown by an arrow 110. However, the movable direction is not limited thereto, and the movable platen 104 may also be movable in other directions. An object held on the platen can be moved along with the movable platen 104. Such flexible pipe connection of the movable platen 104 may permit movement of the movable platen 104 out of the vacuum chamber 102.

The first gas inflow flexible pipe 32b, the first gas outflow flexible pipe 34b, the second gas inflow flexible pipe 36b, and the second gas outflow flexible pipe 38b are all disposed inside the vacuum chamber 102. However, there is no limitation thereto. Any one of the flexible pipes may extend to the outside of the vacuum chamber 102.

The first gas inflow line 32 includes a main heat exchange part 40 and an auxiliary heat exchange part 42 that are disposed in the vacuum chamber 102. The main heat exchange part 40 is disposed downstream of the auxiliary heat exchange part 42, that is, between the auxiliary heat exchange part 42 and the first movable platen flow path 106, and is configured to perform main cooling of the refrigerant gas. In the main heat exchange part 40, the first gas inflow line 32 is thermally coupled to the cooling part 18d. The auxiliary heat exchange part 42 is provided between the first gas flow rate adjusting valve $V_1$ and the main heat exchange part 40 and is configured to perform preliminary cooling of the refrigerant gas. In the auxiliary heat exchange part 42, the first gas inflow line 32 is thermally coupled to the first gas outflow line 34. The first gas inflow line 32 is the high-temperature side of the auxiliary heat exchange part 42, and the first gas outflow line 34 is the low-temperature side of the auxiliary heat exchange part 42. The low-temperature side of the auxiliary heat exchange part 42 is between the first movable platen flow path 106 and the first merging point 30a.

In the auxiliary heat exchange part 42, the first gas inflow line 32 is cooled by heat exchange with the first gas outflow line 34 (at the same time, the first gas outflow line 34 is heated by the first gas inflow line 32). In the main heat exchange part 40, the first gas inflow line 32 is further cooled by the cooling part 18d. In this manner, refrigerant gas that is introduced from the compressor 16 into the low-temperature gas circulation line 22 is cooled by the cold head 18 and supplied to the movable platen 104.

In this way, the main heat exchange part 40 and the movable platen 104 are accommodated in the same vacuum chamber 102, and therefore the main heat exchange part 40 can be disposed close to the movable platen 104. The refrigerant gas pathway from the main heat exchange part 40 to the movable platen 104 is short, and therefore heat loss during refrigerant transport to the movable platen 104 (that is, temperature rise of the refrigerant) is kept under control. This is useful for improvement in the energy saving performance of the cooling apparatus 10.

The main heat exchange part 40 may be provided with a regenerator 41. In that way, when the regenerator 41 is sufficiently cooled, the operation of the cold head 18 can be stopped or a low-output operation (for example, an idle operation) can be performed. This is also useful for improvement in the energy saving performance of the cooling apparatus 10.

The second gas inflow line 36 is disposed thermally non-coupled with the cooling part 18d. The second gas inflow line 36 does not pass through the cooling part 18d, and therefore the refrigerant gas in the second gas inflow line 36 is not cooled. Therefore, refrigerant gas that is introduced from the compressor 16 into the room-temperature gas circulation line 24 is supplied to the movable platen 104 without being cooled.

The second gas outflow line 38 is thermally coupled to the chiller 26 between the first merging point 30a and the second merging point 30b. In this way, the second gas outflow line 38 is cooled by the chiller 26.

Figure 2:
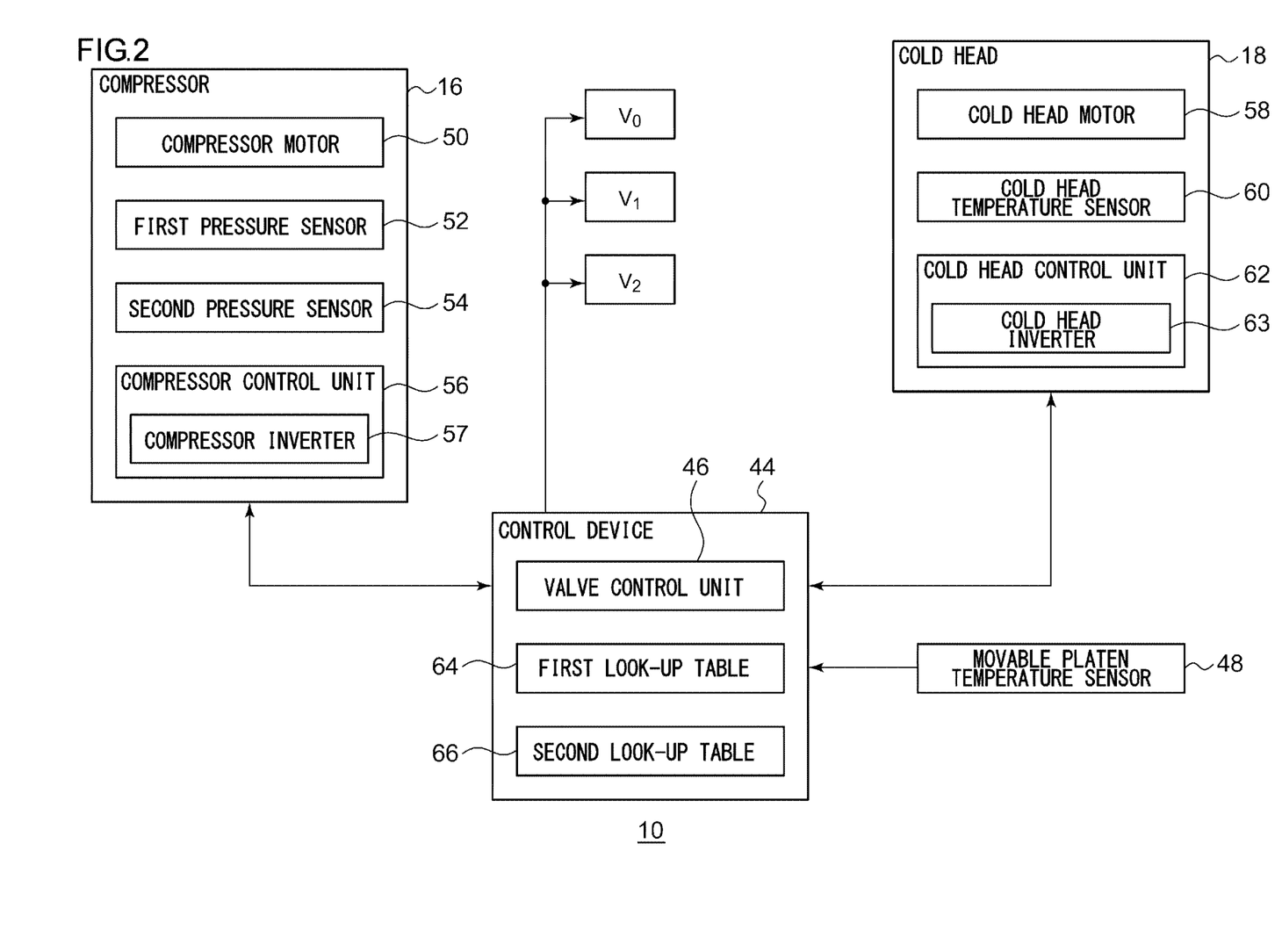
FIG. 2 illustrates a control configuration in the cooling apparatus shown in FIG. 1.

FIG. 2 illustrates a control configuration in the cooling apparatus 10 shown in FIG. 1. Such a control configuration is realized by hardware, software, or a combination thereof. Further, in FIG. 2, the configuration of a relevant portion of the cooling apparatus 10 is schematically shown.

The cooling apparatus 10 is provided with a control device 44 that includes a valve control unit 46. Although details will be described later, the valve control unit 46 is configured to control at least one of the refrigerator gas flow-rate adjusting valve $V_0$, the first gas flow rate adjusting valve $V_1$, and the second gas flow rate adjusting valve $V_2$, based on the state of the movable platen 104, the compressor 16, and/or the cold head 18.

The movable platen 104 is provided with a movable platen temperature sensor 48. The movable platen temperature sensor 48 is mounted on the surface or in the interior of the movable platen 104. The movable platen temperature sensor 48 is configured to measure the temperature of the movable platen 104 and output the measured temperature of the movable platen 104 to the valve control unit 46.

The compressor 16 includes a compressor motor 50 for driving the compressor 16, a first pressure sensor 52 for measuring the pressure of the high-pressure refrigerant gas, a second pressure sensor 54 for measuring the pressure of the low-pressure refrigerant gas, and a compressor control unit 56 that controls the compressor 16. The compressor control unit 56 may be provided in the control device 44.

The first pressure sensor 52 and the second pressure sensor 54 are each configured to output the measured pressure to the valve control unit 46 of the control device 44, and/or the compressor control unit 56. These pressure sensors may be provided at appropriate places of the refrigerator gas circulation line 20. For example, the first pressure sensor 52 may be installed in the refrigerator gas supply line 20a, and the second pressure sensor 54 may be installed in the refrigerator gas exhaust line 20b.

The compressor control unit 56 is provided with a compressor inverter 57 for changing the operation frequency of the compressor 16 (that is, the rotational frequency of the compressor motor 50). The compressor control unit 56 is configured to control the operation frequency of the compressor 16, based on the measured pressure of the first pressure sensor 52 and/or the second pressure sensor 54. The operation frequency is also referred to as the operating speed.

The compressor control unit 56 controls, for example, the pressure differential between the high pressure and the low pressure of the compressor 16 with respect to a target pressure. This is sometimes referred to as pressure-differential constant control in the following. The compressor control unit 56 controls the operation frequency of the compressor 16 for the pressure-differential constant control. A target value for the pressure differential may be changed during execution of the pressure-differential constant control, as necessary.

In the pressure-differential constant control, the compressor control unit 56 obtains the pressure differential between the pressure measured by the first pressure sensor 52 and the pressure measured by the second pressure sensor 54. The compressor control unit 56 determines the operation frequency of the compressor 16 by feedback control (for example, by PID control) such that the pressure differential follows a target value ΔP. The compressor control unit 56 controls the compressor inverter 57 so as to realize the operation frequency.

The cold head 18 includes a cold head motor 58 for driving the cold head 18, a cold head temperature sensor 60 for measuring the temperature of the cooling part 18d, and a cold head control unit 62 that controls the cold head 18. The cold head motor 58 is provided in, for example, the cold head drive mechanism 18f. The cold head control unit 62 may be provided in the control device 44.

The cold head temperature sensor 60 is mounted on the surface or in the interior of the cooling part 18d. The cold head temperature sensor 60 is configured to output the measured temperature to the valve control unit 46 of the control device 44, and/or the cold head control unit 62.

The cold head control unit 62 is provided with a cold head inverter 63 for changing the operation frequency of the cold head 18 (that is, the rotational frequency of the cold head motor 58). The cold head control unit 62 is configured to control the operation frequency of the cold head 18 based on the measured temperature of the cold head temperature sensor 60.

The cold head control unit 62 controls, for example, the temperature of the cooling part 18d to a target temperature. The cold head control unit 62 determines the operation frequency of the cold head 18 by feedback control (for example, by PID control) such that the measured temperature follows the target temperature. The cold head control unit 62 controls the cold head inverter 63 so as to realize the operation frequency. The target temperature can be changed at any time, as necessary.

Further, the control device 44 may be provided with a first look-up table 64 and a second look-up table 66. The valve control unit 46 may be configured to determine the degree of opening of at least one of the refrigerator gas flow-rate adjusting valve $V_0$, the first gas flow-rate adjusting valve $V_1$, and the second gas flow-rate adjusting valve $V_2$ with reference to any one of the tables. The control device 44 may be provided with a function or other information necessary for calculation of a valve opening degree, instead of the look-up table.

For example, the first look-up table 64 represents the relationship between the operation frequency of the compressor 16 and the degree of opening of the first gas flow rate adjusting valve $V_1$. That is, the first look-up table 64 can output the degree of opening of the first gas-flow rate adjusting valve $V_1$ corresponding to the operation frequency of the compressor 16 with the operation frequency as an input. Alternatively, the first look-up table 64 may represent the relationship between the operation frequency of the compressor 16 and the second gas flow-rate adjusting valve $V_2$. The second look-up table 66 may represent the relationship between the temperature of the cooling part 18d and the degree of opening of the refrigerator gas flow-rate adjusting valve $V_0$.

Figure 3:
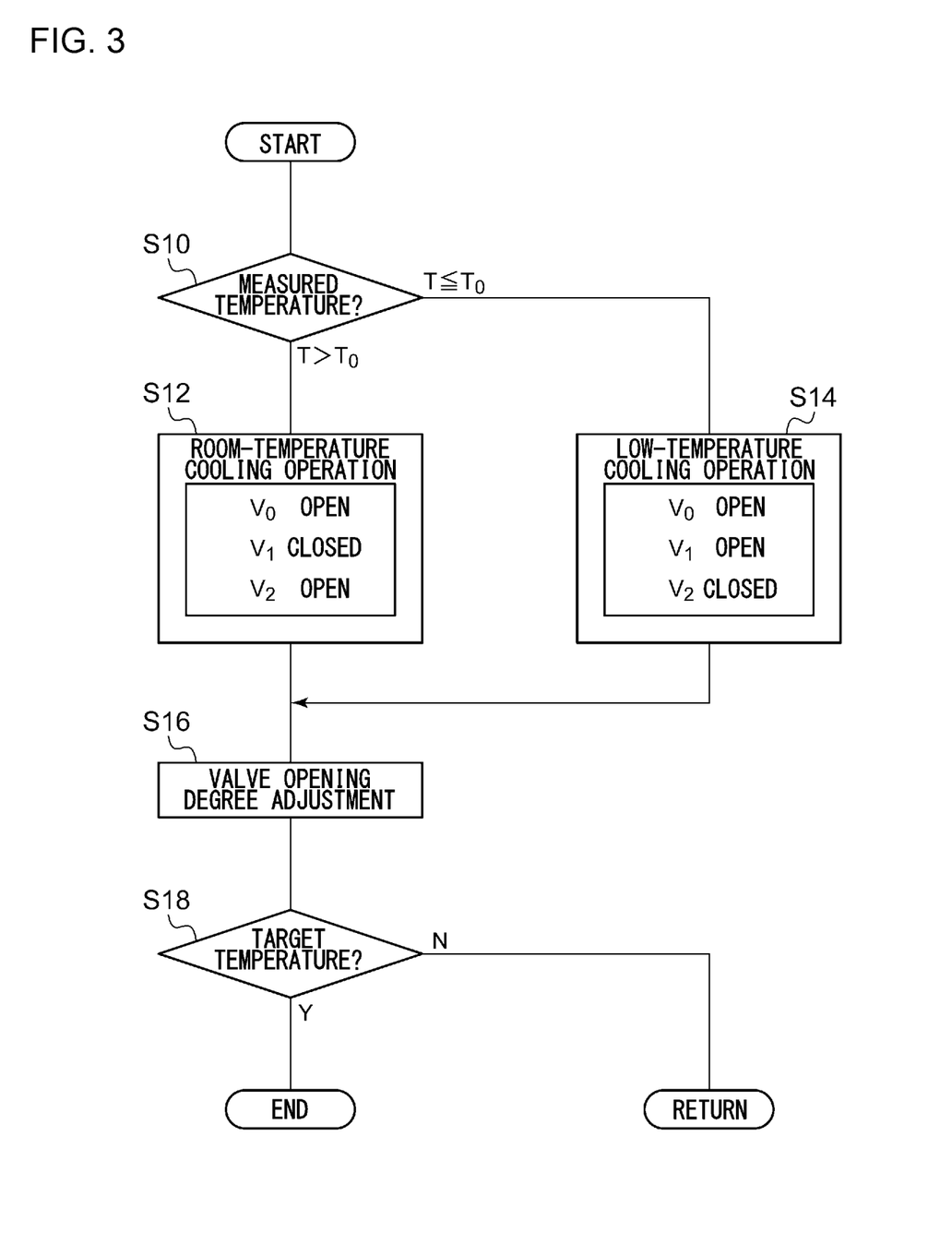
FIG. 3 is a flowchart illustrating a procedure for controlling the cooling apparatus according to the one embodiment of the present invention.

FIG. 3 is a flowchart illustrating a procedure for controlling the cooling apparatus 10 according to an embodiment of the present invention. During the execution of this procedure, the operations of the compressor 16 and the cold head 18 are continued. Therefore, the cooling part 18d is cooled to a desired cooling temperature.

First, the valve control unit 46 determines whether or not a measured temperature T of the movable platen 104 is higher than a temperature threshold value $T_0$ (S10). The measured temperature T of the movable platen 104 is acquired from the movable platen temperature sensor 48, as described above. The temperature threshold value $T_0$ is set in advance and stored in the valve control unit 46. The temperature threshold value $T_0$ may be set to room temperature (for example, about 300 K).

In a case where the measured temperature T of the movable platen 104 is higher than the temperature threshold value $T_0$, the valve control unit 46 selects a room-temperature cooling operation (S12). In the room-temperature cooling operation, the valve control unit 46 closes the first gas flow rate adjusting valve $V_1$ and opens the second gas flow rate adjusting valve $V_2$. Further, in order to continue the operation of the cold head 18, the valve control unit 46 opens the refrigerator gas flow rate adjusting valve $V_0$ to a predetermined degree of opening. In this case, the cold head control unit 62 may stop the operation of the cold head 18 or make the operation of the cold head 18 a low-output operation (for example, an idle operation).

On the other hand, in a case where the measured temperature T of the movable platen 104 is equal to or lower than the temperature threshold value $T_0$, the valve control unit 46 selects a low-temperature cooling operation (S14). In the low-temperature cooling operation, the valve control unit 46 opens the first gas flow rate adjusting valve $V_1$ and closes the second gas flow rate adjusting valve $V_2$. Further, in order to supply the refrigerant gas flow rate necessary for the low-temperature cooling operation, the valve control unit 46 opens the refrigerator gas flow-rate adjusting valve $V_0$ to the degree of opening which is larger than the predetermined degree of opening. That is, in the low-temperature cooling operation, the refrigerator gas-flow rate adjusting valve $V_0$ increases the flow rate of the refrigerator gas circulation line 20, compared to the room-temperature cooling operation.

The valve control unit 46 executes valve opening degree adjustment (S16). Although details will be described later, the valve control unit 46 adjusts the degree of opening of the refrigerator gas flow-rate adjusting valve $V_0$, the first gas flow-rate adjusting valve $V_1$, and/or the second gas flow-rate adjusting valve $V_2$. This processing is optional and may be omitted.

The valve control unit 46 determines whether or not the measured temperature T of the movable platen 104 satisfies a target temperature $T_t$ (S18). In a case where the measured temperature T of the movable platen 104 is higher than the target temperature $T_t$ (Y in S18), the valve control unit 46 ends this procedure. In this case, the control device 44 may stop the operation of the cooling apparatus 10. Alternatively, the control device 44 may continue the operation of the cooling apparatus 10 such that the measured temperature T of the movable platen 104 is maintained at the target temperature $T_t$.

On the other hand, in a case where the measured temperature T of the movable platen 104 is equal to or lower than the target temperature $T_t$ (N in S18), the valve control unit 46 repeats this procedure. That is, the valve control unit 46 compares the measured temperature T of the movable platen 104 with the temperature threshold value again and selects the room-temperature cooling operation or the low-temperature cooling operation.

The operation of the cooling apparatus 10 by the above configuration will be described. Although it depends on the use of the vacuum apparatus 100, an object having a considerably higher temperature than the temperature of the cooling part 18d is often loaded on the movable platen 104. For example, a wafer having a temperature of about 450 K is loaded on the movable platen 104. The cooling apparatus 10 is required to cool the wafer to, for example, about 100 K.

Under such circumstances, the object to be cooled is initially quite hot. For this reason, the cooling apparatus 10 shuts off the low-temperature gas circulation line 22 and opens the room-temperature gas circulation line 24 to perform the room-temperature cooling operation. The refrigerant gas of the room-temperature gas circulation line 24 is relatively lower than the high temperature of the object to be cooled, and therefore, cooling is possible with the room-temperature cooling operation. After the object has been cooled to the room temperature, switching to the low-temperature cooling operation is performed and the object is cooled to a desired cooling temperature.

By shut-off of the low-temperature gas circulation line 22 during the room-temperature cooling operation, it is possible to reduce the discharge amount of the refrigerant gas of the compressor 16. During the room-temperature cooling operation, it is possible to cool the object without operating the cold head 18 (or with a low-power operation). Further, even by shut-off of the room-temperature gas circulation line 24 during the low-temperature cooling operation, it is possible to reduce the amount of refrigerant-gas discharge from the compressor 16. The power consumption of the compressor 16 is kept under control, and therefore the energy saving performance of the cooling apparatus 10 is improved.

The present invention has been described above based on the one example. The present invention is not limited to the embodiment described above, and it will be understood by those skilled in the art that various design changes can be made, various modification examples can be made, and such modification examples are also included within the scope of the present invention.

Figure 4:
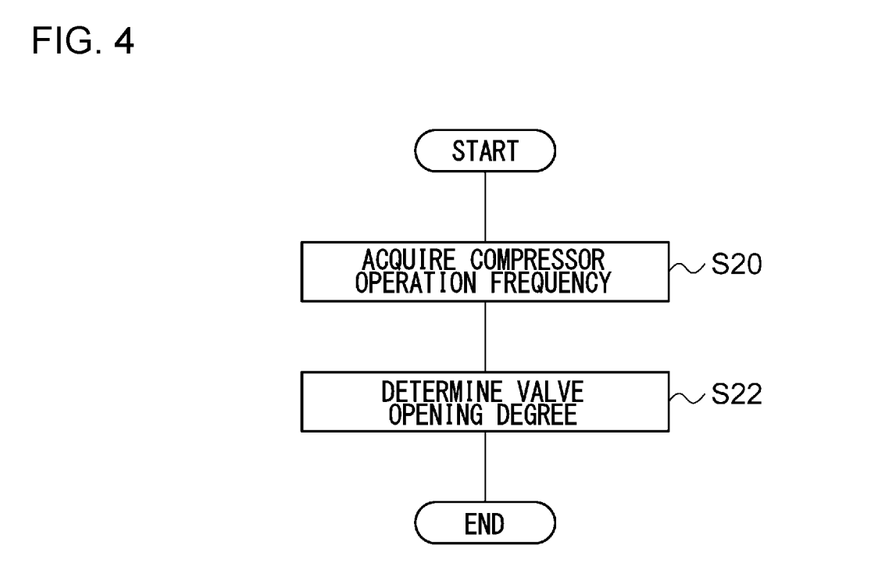
FIG. 4 illustrates one example of the valve opening degree adjustment shown in FIG. 3.

FIG. 4 illustrates the valve opening degree adjustment (S16) shown in FIG. 3. First, the valve control unit 46 acquires the operation frequency of the compressor 16 (S20). The operation frequency of the compressor 16 is acquired from the compressor control unit 56.

The valve control unit 46 determines the degree of opening of the first gas flow-rate adjusting valve $V_1$ and/or the second gas flow-rate adjusting valve $V_2$ according to the operation frequency of the compressor 16 (S22). In some embodiments, the valve control unit 46 refers to the first look-up table 64 to acquire the degree of opening of the first gas flow rate adjusting valve $V_1$ and/or the second gas flow rate adjusting valve $V_2$ corresponding to the operation frequency of the compressor 16. The valve control unit 46 controls the first gas flow-rate adjusting valve $V_1$ and/or the second gas flow-rate adjusting valve $V_2$ according to the determined valve opening degree.

The first look-up table 64 may be set so as to make the degree of opening of the first gas flow-rate adjusting valve $V_1$ and/or the second gas flow-rate adjusting valve $V_2$ relatively small in a case where the operation frequency of the compressor 16 is relatively large. In other words, the first look-up table 64 may be set so as to make the degree of opening of the first gas flow-rate adjusting valve $V_1$ and/or the second gas flow-rate adjusting valve $V_2$ relatively large in a case where the operation frequency of the compressor 16 is relatively small. In this way, if the load on the compressor 16 is large, the valve opening degree is reduced. The flow rate of the refrigerant gas in the circulative cooling device 14 is reduced, and therefore it is possible to alleviate the load on the compressor 16. Therefore, it is possible to improve the energy saving performance of the cooling apparatus 10.

Alternatively, the first look-up table 64 may be set so as to make the first gas flow-rate adjusting valve $V_1$ and/or the second gas flow-rate adjusting valve $V_2$ have the maximum opening degree in a case where the operation frequency of the compressor 16 is sufficient small. In this manner, when there is surplus force in the compressor 16, the degree of opening may be changed to larger than the standard valve-opening degree for energy saving described above. In this case, it is possible to rapidly cool the object.

Figure 5:
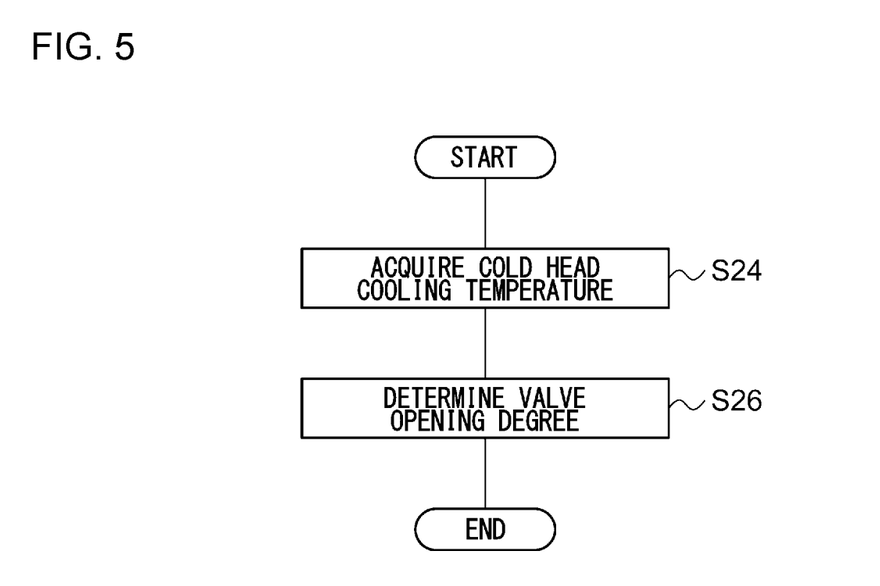
FIG. 5 illustrates another example of the valve opening degree adjustment shown in FIG. 3.

FIG. 5 shows another example of the valve opening degree adjustment (S16) shown in FIG. 3. The valve control unit 46 acquires the temperature of the cooling part 18d of the cold head 18 (S24). The temperature of the cooling part 18d is acquired from the cold head temperature sensor 60.

The valve control unit 46 controls the refrigerator gas flow-rate adjusting valve $V_0$ according to the measured temperature of the cooling part 18d (S26). In some embodiments, the valve control unit 46 refers to the second look-up table 66 to acquire the degree of opening of the refrigerator gas flow-rate adjusting valve $V_0$ corresponding to the temperature of the cooling part 18d. The valve control unit 46 controls the refrigerator gas flow-rate adjusting valve $V_0$ according to the valve opening degree.

The second look-up table 66 may be set so as to make the degree of opening of the refrigerator gas flow-rate adjusting valve $V_0$ relatively small in a case where the measured temperature of the cooling part 18d is relatively low, and to make the degree of opening of the refrigerator gas flow-rate adjusting valve $V_0$ relatively large in a case where the measured temperature of the cooling part 18d is relatively high. In this way, it is possible to adjust the gas flow rate of the refrigerator gas circulation line 20 according to a thermal load on the cold head 18.

Such opening degree adjustment of the refrigerator gas flow-rate adjusting valve $V_0$ may be applied to a cold head 18 that is operated at a constant operation frequency. The cold head 18 optionally may not be provided with the cold head inverter 63.

Figure 6:
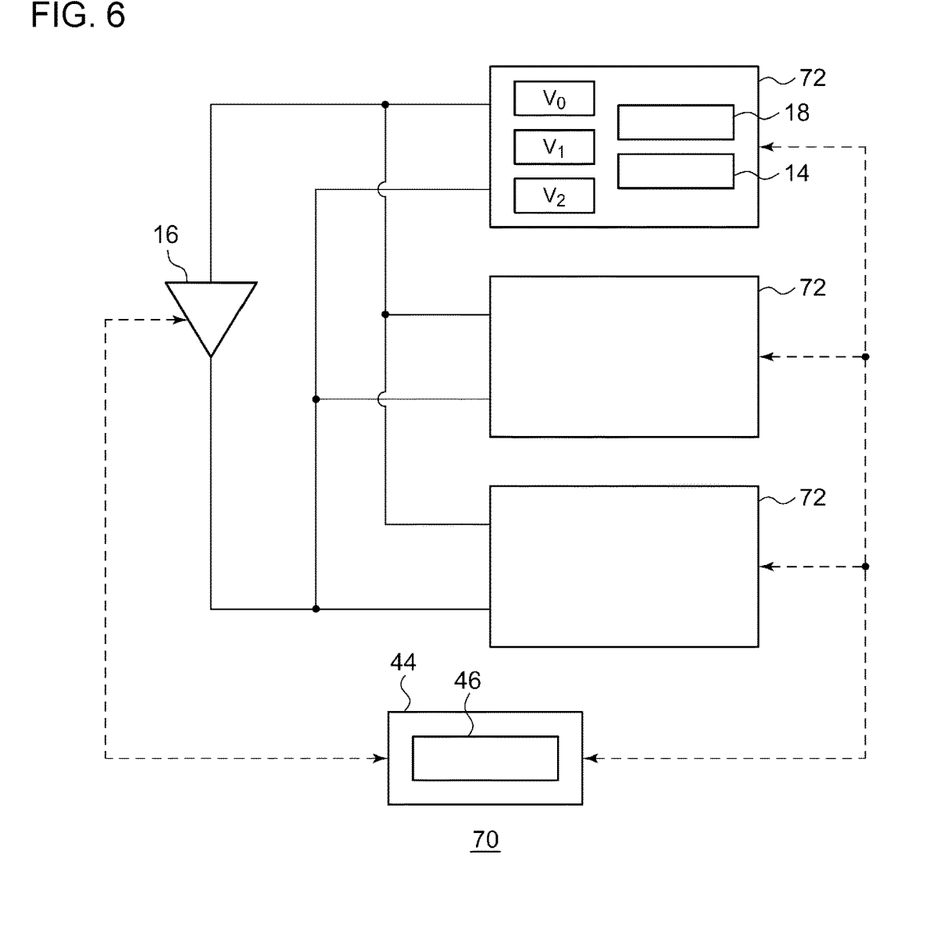
FIG. 6 schematically shows a movable platen cooling system according to another embodiment.

FIG. 6 schematically shows a movable platen cooling system 70 according to another embodiment. The movable platen cooling system 70 may include the compressor 16 and a plurality of movable platen cooling sub-systems 72. The compressor 16 is shared by the plurality of sub-systems. Each of the plurality of movable platen cooling sub-systems 72 is provided with the circulative cooling device 14 and the cold head 18, similar to the cooling apparatus 10 shown in FIG. 1, and the circulative cooling device 14 and the cold head 18 are connected to the compressor 16. Further, each sub-system is provided with the refrigerator gas flow-rate adjusting valve $V_0$, the first gas flow-rate adjusting valve $V_1$, and the second gas flow-rate adjusting valve $V_2$.

In a case where the cooling method illustrated in FIGS. 3 and 4 is applied to the movable platen cooling system 70, the valve control unit 46 of the control device 44 may commonly determine the degree of opening of the second gas flow-rate adjusting valve $V_2$ of each of the movable platen cooling sub-systems 72 according to the operation frequency of the compressor 16 and/or commonly determine the degree of opening of the first gas flow-rate adjusting valve $V_1$ of each of the movable platen cooling sub-systems 72. In this case as well, the load on the compressor 16 can be alleviated, and thus the energy saving performance of the movable platen cooling system 70 can be improved.

Figure 7:
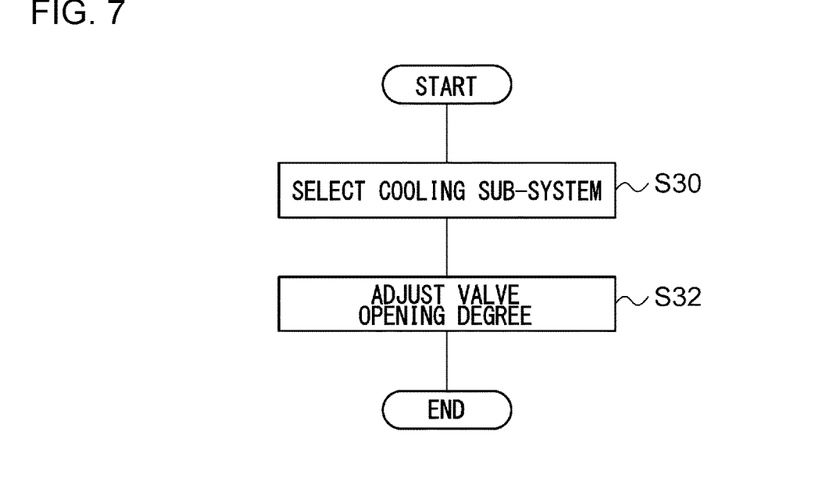
FIG. 7 illustrates a valve opening degree adjustment according to the other embodiment.

FIG. 7 illustrates the valve opening degree adjustment (S16) according to the other embodiment. The valve control unit 46 selects one movable platen cooling sub-system 72 from the plurality of movable platen cooling sub-systems 72 (S30). The valve control unit 46 may select the movable platen cooling sub-system 72, based on, for example, an operation rate of the movable platen cooling sub-system 72. For example, the movable platen cooling sub-system 72 having a high operation rate may be selected.

The valve control unit 46 controls at least one of the first gas flow-rate adjusting valve $V_1$ and/or the second gas flow-rate adjusting valve $V_2$ according to the operation frequency of the compressor 16 with respect to the selected movable platen cooling sub-system (S32). The valve control unit 46 may acquire the operation frequency of the compressor 16 and determine the degree of opening of the first gas flow-rate adjusting valve $V_1$ and/or the second gas flow-rate adjusting valve $V_2$ according to the operation frequency, similar to the valve opening degree adjustment shown in FIG. 4. In this case as well, the load on the compressor 16 can be alleviated, and thus the energy saving performance of the movable platen cooling system 70 can be improved.

In some embodiments, in order to rapidly cool the object, the valve control unit 46 may execute the low-temperature cooling operation regardless of the measured temperature of the movable platen temperature sensor 48. The valve control unit 46 may start the low-temperature cooling operation without executing the room-temperature cooling operation or may select the low-temperature cooling operation as needed during the room-temperature cooling operation.

The present invention can be used in the field of a movable platen cooling apparatus and a movable platen cooling system.

It should be understood that the invention is not limited to the above-described embodiments, but may be modified into various forms on the basis of the spirit of the invention. Additionally, such modifications are included in the scope of the invention.

What is claimed is:

1. A movable platen cooling apparatus for cooling a movable platen that holds an object in a vacuum chamber, the cooling apparatus comprising:
    a compressor;
    a cold head fixed to the vacuum chamber and including a cooling part disposed in the vacuum chamber;
    a refrigerator gas supply line including a branching part, and supplying a refrigerant gas from the compressor to the cold head;
    a refrigerator gas exhaust line including a merging part, and exhausting the refrigerant gas from the cold head to the compressor;
    a first gas inflow line branching off from the refrigerator gas supply line at the branching part to connect to a first movable platen flow path such that the refrigerant gas flows from the compressor into the movable platen, the first gas inflow line including a heat exchange part thermally coupled to the cooling part;
    a first gas outflow line connected to the first movable platen flow path such that the refrigerant gas flows out from the movable platen to the compressor, and merging with the refrigerator gas exhaust line at the merging part;
    a second gas inflow line branching off from the refrigerator gas supply line at the branching part to connect to a second movable platen flow path such that the refrigerant gas flows from the compressor into the movable platen, the second gas inflow line being disposed to thermally non-coupled with the cooling part; and
    a second gas outflow line connected to the second movable platen flow path such that the refrigerant gas flows out from the movable platen to the compressor, and merging with the refrigerator gas exhaust line at the merging part.

2. The movable platen cooling apparatus according to claim 1, wherein:
    the first gas inflow line includes a first gas-inflow flexible pipe connected to the first movable platen flow path to allow the movable platen to be movable in the vacuum chamber;
    the first gas outflow line includes a first gas-outflow flexible pipe connected to the first movable platen flow path to allow the movable platen to be movable in the vacuum chamber;
    the second gas inflow line includes a second gas-inflow flexible pipe connected to the second movable platen flow path to allow the movable platen to be movable in the vacuum chamber; and
    the second gas outflow line includes a second gas-outflow flexible pipe connected to the second movable platen flow path to allow the movable platen to be movable in the vacuum chamber.

3. The movable platen cooling apparatus according to claim 1, wherein:
    the refrigerator gas supply line includes a refrigerator gas flow-rate adjusting valve;
    the first gas inflow line includes a first gas flow-rate adjusting valve;
    the second gas inflow line includes a second gas flow-rate adjusting valve; and
    the cooling apparatus further comprises a valve control unit for controlling at least one of the refrigerator gas flow-rate adjusting valve, the first gas flow-rate adjusting valve, and the second gas flow-rate adjusting valve, based on status of any from among the movable platen, the compressor, and the cold head.

4. The movable platen cooling apparatus according to claim 3, further comprising:
    a movable platen temperature sensor for outputting a measured temperature of the movable platen to the valve control unit; wherein
    the valve control unit,
        in cases where the measured temperature of the movable platen is higher than a predetermined temperature threshold value, closes the first gas flow-rate adjusting valve and opens the second gas flow-rate adjusting valve, and,
        in cases where the measured temperature of the movable platen is lower than the predetermined temperature threshold value, opens the first gas flow-rate adjusting valve and closes the second gas flow-rate adjusting valve.

5. The movable platen cooling apparatus according to claim 4, wherein the valve control unit:
in cases where the measured temperature of the movable platen is higher than the predetermined temperature threshold value, opens the refrigerator gas flow-rate adjusting valve to a predetermined degree of opening; and
in cases where the measured temperature of the movable platen is lower than the predetermined temperature threshold value, opens the refrigerator gas flow-rate adjusting valve to a degree of opening larger than the predetermined degree of opening.

6. The movable platen cooling apparatus according to claim 4, wherein:
the compressor includes a compressor motor, and a compressor control unit for controlling operation frequency of the compressor motor and outputting the operation frequency to the valve control unit; and
the valve control unit determines according to the operation frequency the degree of opening of at least either the first gas flow-rate adjusting valve or the second gas flow-rate adjusting valve.

7. The movable platen cooling apparatus according to claim 3, further comprising:
a cold head temperature sensor that outputs the measured temperature of the cooling part to the valve control unit; wherein
the valve control unit controls the refrigerator gas flow-rate adjusting valve according to a measured temperature of the cooling part.

8. A movable platen cooling apparatus for cooling a movable platen that holds an object in a vacuum chamber, the cooling apparatus comprising:
a compressor;
a cold head fixed to the vacuum chamber and including a cooling part disposed in the vacuum chamber;
a refrigerator gas supply line including a branching part, and supplying a refrigerant gas from the compressor to the cold head;
a refrigerator gas exhaust line that including a merging part, and exhausting the refrigerant gas from the cold head to the compressor;
a first gas inflow line branching off from the refrigerator gas supply line at the branching part to connect to a first movable platen flow path such that the refrigerant gas flows from the compressor into the movable platen, the first gas inflow line including a heat exchange part thermally coupled to the cooling part;
a first gas outflow line connected to the first movable platen flow path such that the refrigerant gas flows out from the movable platen to the compressor, and merging with the refrigerator gas exhaust line at the merging part;
a refrigerator gas flow-rate adjusting valve disposed in the refrigerator gas supply line;
a first gas flow-rate adjusting valve disposed in the first gas inflow line; and
a valve control unit for controlling at least one of the refrigerator gas flow-rate adjusting valve and the first gas flow-rate adjusting valve, based on status of any from among the movable platen, the compressor, and the cold head.

9. A movable platen cooling system comprising:
a compressor; and
a plurality of movable platen cooling sub-systems, each of the plurality of movable platen cooling sub-systems including a cold head fixed to the vacuum chamber and including a cooling part that is disposed in the vacuum chamber,
a refrigerator gas supply line including a branching part, and supplying a refrigerant gas from the compressor to the cold head,
a refrigerator gas exhaust line including a merging part, and exhausting the refrigerant gas from the cold head to the compressor,
a first gas inflow line branching off from the refrigerator gas supply line at the branching part to connect to a first movable platen flow path such that the refrigerant gas flows from the compressor into a movable platen that holds an object in the vacuum chamber, the first gas inflow line including a heat exchange part thermally coupled to the cooling part,
a first gas outflow line connected to the first movable platen flow path such that the refrigerant gas flows out from the movable platen to the compressor, and merging with the refrigerator gas exhaust line at the merging part,
a second gas inflow line branching off from the refrigerator gas supply line at the branching part to connect to a second movable platen flow path such that the refrigerant gas flows from the compressor into the movable platen, the second gas inflow line being disposed to be thermally non-coupled with the cooling part, and
a second gas outflow line connected to the second movable platen flow path such that the refrigerant gas flows out from the movable platen to the compressor, and merging with the refrigerator gas exhaust line at the merging part.

10. The movable platen cooling system according to claim 9, wherein:
each of the plurality of movable platen cooling sub-systems includes a first gas flow-rate adjusting valve provided in the first gas inflow line, and a second gas flow-rate adjusting valve provided in the second gas inflow line; and
the cooling system further comprises a valve control unit for controlling at least one of the first gas flow rate adjusting valve and the second gas flow rate adjusting valve, based on status of any from among the movable platen, the compressor, and the cold head.

11. The movable platen cooling system according to claim 10, wherein:
the compressor includes a compressor motor, and a compressor control unit for controlling operation frequency of the compressor motor and outputting the operation frequency to the valve control unit; and
the valve control unit at least either commonly determines according to the operation frequency the degree of opening of the second gas flow-rate adjusting valve of each of the movable platen cooling sub-systems, or commonly determines according to the operation frequency the degree of opening of the first gas flow-rate adjusting valve of each movable platen cooling sub-system.

12. The movable platen cooling system according to claim 10, wherein:
the compressor includes a compressor motor, and a compressor control unit for controlling operation frequency of the compressor motor and outputting the operation frequency to the valve control unit; and
the valve control unit selects one movable platen cooling sub-system from among the plurality of movable platen cooling sub-systems, and according to the operation frequency with respect to the selected movable platen cooling sub-system, controls at least either the first gas flow-rate adjusting valve or the second gas flow-rate adjusting valve.

\* \* \* \* \*